US010339589B2

United States Patent
Humphreys

(10) Patent No.: US 10,339,589 B2
(45) Date of Patent: Jul. 2, 2019

(54) CONNECTED CONSUMABLES PREPARATION AREA

(71) Applicant: MASTERCARD INTERNATIONAL INCORPORATED, Purchase, NY (US)

(72) Inventor: Derek Humphreys, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 724 days.

(21) Appl. No.: 14/940,306

(22) Filed: Nov. 13, 2015

(65) Prior Publication Data

US 2016/0140646 A1    May 19, 2016

(30) Foreign Application Priority Data

Nov. 14, 2014   (GB) .................................. 1420298.0
May 5, 2015     (EP) ................................... 15166481

(51) Int. Cl.
*G06Q 10/00*    (2012.01)
*G06Q 30/06*    (2012.01)
*G06Q 10/08*    (2012.01)

(52) U.S. Cl.
CPC ....... *G06Q 30/0633* (2013.01); *G06Q 10/087* (2013.01); *G06Q 30/06* (2013.01)

(58) Field of Classification Search
CPC .. G06Q 30/0633; G06Q 10/087; G06Q 30/06; G07F 17/0078
USPC ..................................................... 705/16, 28
See application file for complete search history.

(56) References Cited

U.S. PATENT DOCUMENTS

| 6,327,576 | B1 | 12/2001 | Ogasawara |
| 7,266,344 | B2* | 9/2007 | Rodriguez .......... H04L 12/2803 340/12.28 |
| 8,676,718 | B2* | 3/2014 | Villegas ................ G06Q 50/12 705/332 |
| 2003/0023493 | A1 | 1/2003 | Ohashi et al. |
| 2007/0254080 | A1* | 11/2007 | Schackmuth .......... G06Q 10/06 426/523 |
| 2008/0052200 | A1 | 2/2008 | Bodin et al. |
| 2010/0274676 | A1* | 10/2010 | Hrudka ................ G06Q 10/087 705/15 |
| 2012/0278190 | A1 | 11/2012 | Brown |
| 2015/0302569 | A1* | 10/2015 | Armstrong .......... F04D 15/0066 382/190 |

FOREIGN PATENT DOCUMENTS

KR    1020130128058    11/2013

* cited by examiner

*Primary Examiner* — Rokib Masud
(74) *Attorney, Agent, or Firm* — Harness, Dickey & Pierce, P.L.C.

(57) ABSTRACT

According to one aspect there is provided a consumables preparation area comprising an electronically stored consumables inventory update initiator, said update initiator: comprising one or more of: a barcode scanner, a quick response (QR) code scanner, a Radio-Frequency Identification (RFID) tag reader, a scanner configured for optical character recognition (OCR) and digital scales; and being configured for use within the dwelling or establishment in which said consumables are to be transformed for use. According to another aspect there is provided a method of updating an electronically stored consumables inventory using such a consumables preparation area.

12 Claims, 4 Drawing Sheets

CONNECTED CONSUMABLES PREPARATION AREA

CROSS-REFERENCE TO RELATED APPLICATIONS

This application claims the benefit of and priority to Great Britain Application No. 1420298.0 filed Nov. 14, 2014, and European Patent Application No. 15166481.0 filed May 5, 2015. The entire disclosures of the above applications are incorporated herein by reference.

FIELD

The present disclosure generally relates to using a consumables preparation area to update an electronically stored consumables inventory. In particular, but not exclusively, the present disclosure relates to appliances, systems, and methods for tracking and replenishing product inventory for households, offices and commercial environments and providing associated services.

BACKGROUND

This section provides background information related to the present disclosure which is not necessarily prior art.

Consumers often forget what consumable items they have in their home. This is particularly inconvenient when shopping for groceries and/or planning a meal, without access to the content of their fridge, pantry and the like. Consumers may end up buying groceries in excess and/or forget to buy food items or other products they need.

Consumers also struggle to remember the expiry dates on the perishable items they have. Rather commonly, this results in unconsumed food and drink items being discarded, such as when their shelf life has expired.

Household appliances are becoming increasingly connected. A smart refrigerator is a smart appliance designed to help consumers to avoid unnecessary waste by maintaining inventory of the grocery items it stores. A smart refrigerator typically includes a computer system that includes inputs/outputs, such as through user interface devices e.g. a touchscreen, and is coupled to the Internet via a local wired or wireless network. Such a computer system may be added to a conventional refrigerator, e.g. a tablet computer attached to the refrigerator, or integrated or embedded within the refrigerator at the time it is manufactured. The smart refrigerator maintains inventory of its content, and may also issue alerts in respect of the shelf life expiration for a particular product on the inventory list and/or provide recipes and/or help the consumer with the preparation of a shopping list. It may also perform other functions, such as enabling its users to access the Internet, upload and store digital photos and so on. Some smart refrigerators also allow the user to access their internal data remotely, for example, via a mobile device with internet access.

However, for a smart refrigerator to be able to provide such services, consumers are typically required to manually enter all information concerning the products stored in the refrigerator, such as what the product is (for example by selecting from pre-defined categories), its size, its expiry date, and the like, and then make updates as the inventory changes.

Further, not all of a household's groceries are stored in the refrigerator, so relying on a smart refrigerator to create a shopping list can result in some items being missed.

SUMMARY

This section provides a general summary of the disclosure, and is not a comprehensive disclosure of its full scope or all of its features. Aspects and embodiments of the disclosure are also set out in the accompanying claims.

According to a first aspect there is provided a consumables preparation area comprising an electronically stored consumables inventory update initiator. Said update initiator comprises one or more of: a barcode scanner, a quick response (QR) code scanner, a Radio-Frequency Identification (RFID) tag reader, a scanner configured for optical character recognition (OCR) and digital scales. The update initiator is configured for use within the dwelling or establishment in which said consumables are to be transformed for use.

Said consumables preparation area could comprise a substantially flat consumables preparation surface.

Said surface could comprise a touch screen portion. Said surface could comprise a chopping board portion. Said surface could comprise a digital scales portion.

The consumables preparation area could comprise a back wall rising from the periphery of said surface. The consumables preparation area could comprise one or more side walls rising from the periphery of said surface.

One or more of said one or more walls could comprise one or more barcode scanners. One or more of said one or more walls could comprise one or more QR code scanners.

The consumables preparation area could comprise a detachable handheld barcode scanner. The consumables preparation area could comprise a detachable handheld QR code scanner.

The consumables preparation area could comprise a transmitter. Said transmitter could be wireless.

Said transmitter could be configured to send a message to initiate control of a kitchen appliance having a receiver when the update initiator makes a detection determined to indicate that a predetermined stage of a recipe has been reached.

According to a second aspect there is provided a system for maintaining an electronically stored consumables inventory comprising: a consumables preparation area according to the first aspect; electronic data processing means, connected to the update initiator, configured to process data received therefrom and accordingly update the consumables inventory; and electronic data storage means configured to store the consumables inventory.

Said electronic data processing means could be configured to initiate placement of an order through an electronic merchant ordering system in response to determining that the consumables inventory does not match a predetermined list of consumable items.

Said electronic data storage means could be further configured to store authentication data stored during an initial set-up procedure. Said order placement could comprise transmitting an authorisation comprising or derived from said authentication data.

The system could further comprise a user interface device configured to collect authentication data from a user. Said order placement could comprise transmitting an authorisation comprising or derived from said authentication data.

Said user interface device could comprise one or more of: a keypad, a microphone, a Near Field Communication (NFC) reader, a fingerprint scanner and an iris scanner.

Said electronic data storage means could be further configured to store a list of one or more merchants. Said order could be made with one of said list selected according to one or more predetermined rules.

The system could further comprise networking apparatus configured to provide the system with an internet connection. Said electronic data processing means could be configured to search the internet for merchants of items on said predetermined list of consumable items. Said order could be made with one of said merchants selected according to one or more predetermined rules.

Said electronic data storage means could be further configured to store details of one or more loyalty cards, coupons or discount vouchers. Initiating placement of said order could comprise providing details of one or more of said loyalty cards, coupons or discount vouchers to said ordering system.

The electronic data processing means could be configured to update the consumables inventory in response to receiving an indication from the update initiator that an item of the consumables inventory contains less than a predetermined number of servings. The electronic data processing means could be configured to update the consumables inventory in response to the passing of an expiration date stored for an item of the consumables inventory in the electronic data storage means. The electronic data processing means could be configured to update the consumables inventory in response to receiving an indication from a server of a consumables merchant, a bank or a card issuer that a consumable item has been purchased in a transaction involving a user credit card, debit card or loyalty card, an identifier for said user card being stored in the electronic data storage means.

The electronic data storage means could be configured to store an expiration date for an item of the consumables inventory in response to receiving an indication of the expiration date from the update initiator. The electronic data storage means could be configured to store an expiration date for an item of the consumables inventory in response to receiving an indication of the expiration date from a server of a consumables merchant, a bank or a card issuer. Said indication of the expiration date could be comprised in a barcode, a QR code, an RFID tag or a label on the item readable by a user and capable of being entered by the user into a user interface device.

The electronic data processing means could be self-learning.

The electronic data processing means could be configured to analyse past usage patterns in order to make predictions and/or suggestions and/or place orders automatically. The electronic data processing means could be configured to analyse past ordering patterns in order to make predictions and/or suggestions and/or place orders automatically. The electronic data processing means could be configured to analyse a user's calendar/diary in order to make predictions and/or suggestions and/or place orders automatically. The electronic data processing means could be configured to analyse weather reports/forecasts in order to make predictions and/or suggestions and/or place orders automatically.

The electronic data storage means could be configured to store a list of one or more forbidden ingredients. The electronic data processing means could be configured to, in response to determining that a consumable item comprising one or more of said forbidden ingredients is to be added to the consumables inventory, initiate an alert.

Said initiation of an alert could comprise issuing an alert message to the consumables preparation area, which is configured to, in response to receiving said alert message, provide an alert to a user by means of a user interface device comprised therein. Said initiation of an alert could comprise issuing an alert message to a user device comprising or capable of communicating with the electronic data processing means. Said user device could comprise a user interface device configured to, in response to receiving said alert message, provide an alert to a user.

Said electronic data processing means could be further configured to receive data from a customer ordering and/or payment system. Said electronic data processing means could be further configured to analyse data received from both the consumables preparation area and said customer ordering and/or payment system in order to track stock usage.

According to a third aspect there is provided a method of maintaining an electronically stored consumables inventory comprising: receiving an indication from a consumables preparation area comprising an electronically stored consumables inventory update initiator, said update initiator comprising one or more of: a user interface device, a barcode scanner, a quick response (QR) code scanner, a Radio-Frequency Identification (RFID) tag reader, a scanner configured for optical character recognition (OCR) and digital scales, said indication being of a consumable item being detected by said update initiator; and in response to receiving said indication, updating the inventory.

The method could further comprise comparing the inventory with a predetermined list of consumable items. The method could further comprise making a determination that the inventory does not match the predetermined list of consumable items. The method could further comprise initiating placement of an order through an electronic merchant ordering system in response to said determination.

The method could further comprise storing authentication data during an initial set-up procedure. The method could further comprise, when initiating placement of said order, transmitting an authorisation comprising or derived from said authentication data.

The method could further comprise, prior to storing the authentication data, collecting it from a user by means of a user interface device. Said user interface device could comprise one or more of: a keypad, a microphone, a Near Field Communication (NFC) reader, a fingerprint scanner and an iris scanner.

Said order could be made with one of a predetermined list of merchants, said merchant being selected from said list according to one or more predetermined rules.

The method could further comprise searching the internet for merchants of items on said predetermined list of consumable items. Said order could be made with one of said merchants selected according to one or more predetermined rules.

Initiating placement of said order could comprise providing details of one or more predetermined loyalty cards, coupons or discount vouchers.

The consumables inventory could be updated in response to receiving an indication from the update initiator that a consumable item has been placed on or near the consumables preparation area. The consumables inventory could be updated in response to receiving an indication from the update initiator that an item of the consumables inventory contains less than a predetermined number of servings. The consumables inventory could be updated in response to the passing of a predetermined expiration date for an item of the consumables inventory. The consumables inventory could be updated in response to receiving an indication from a server of a consumables merchant, a bank or a card issuer that a consumable item has been purchased in a transaction involving a predetermined user credit card, debit card or loyalty card.

The method could further comprise receiving an indication of an expiration date of an item of the consumables inventory from the update initiator or from a server of a consumables merchant, a bank or a card issuer. Said indication of the expiration date could be comprised in a barcode, a QR code, an RFID tag or a label on the item readable by a user and capable of being entered by the user into a user interface device. The method could further comprise storing said expiration date.

The method could further comprise performing an analysis of one or more of: past usage patterns, past ordering patterns, a user's calendar/diary and weather reports/forecasts. The method could further comprise, using said analysis, making predictions and/or suggestions and/or initiating placement of orders automatically.

The method could further comprise, in response to determining that a consumable item comprising one or more of a predetermined list of forbidden ingredients is to be added to the consumables inventory, initiating an alert.

Said initiation of an alert could comprise one or more of: issuing an alert message to: the consumables preparation area, which is configured to, in response to receiving said alert message, provide an alert to a user by means of a user interface device comprised therein; and a user device comprising a user interface device configured to, in response to receiving said alert message, provide an alert to a user.

The method could further comprise receiving an indication from a customer ordering and/or payment system that a product has been ordered. The method could further comprise analysing both said indication that a product has been ordered and the indication of a consumable item being detected by the update initiator in order to track stock usage.

The method could further comprise storing a recipe in electronic data storage means. The method could further comprise receiving an indication from the consumables preparation area that an ingredient listed in said recipe is detected by said update initiator. The method could further comprise, in response to receiving said indication, initiating transmission of a control signal to a kitchen appliance in accordance with instructions comprised in the recipe.

According to a fourth aspect there is provided a consumables preparation area substantially as herein described with reference to the accompanying figures.

According to a fifth aspect there is provided a system substantially as herein described with reference to the accompanying figures.

According to a sixth aspect there is provided a method substantially as herein described with reference to the accompanying figures.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Implementations will now be described in detail, by way of example only, with reference to the accompanying drawings, in which.

DETAILED DESCRIPTION

Figure 1:
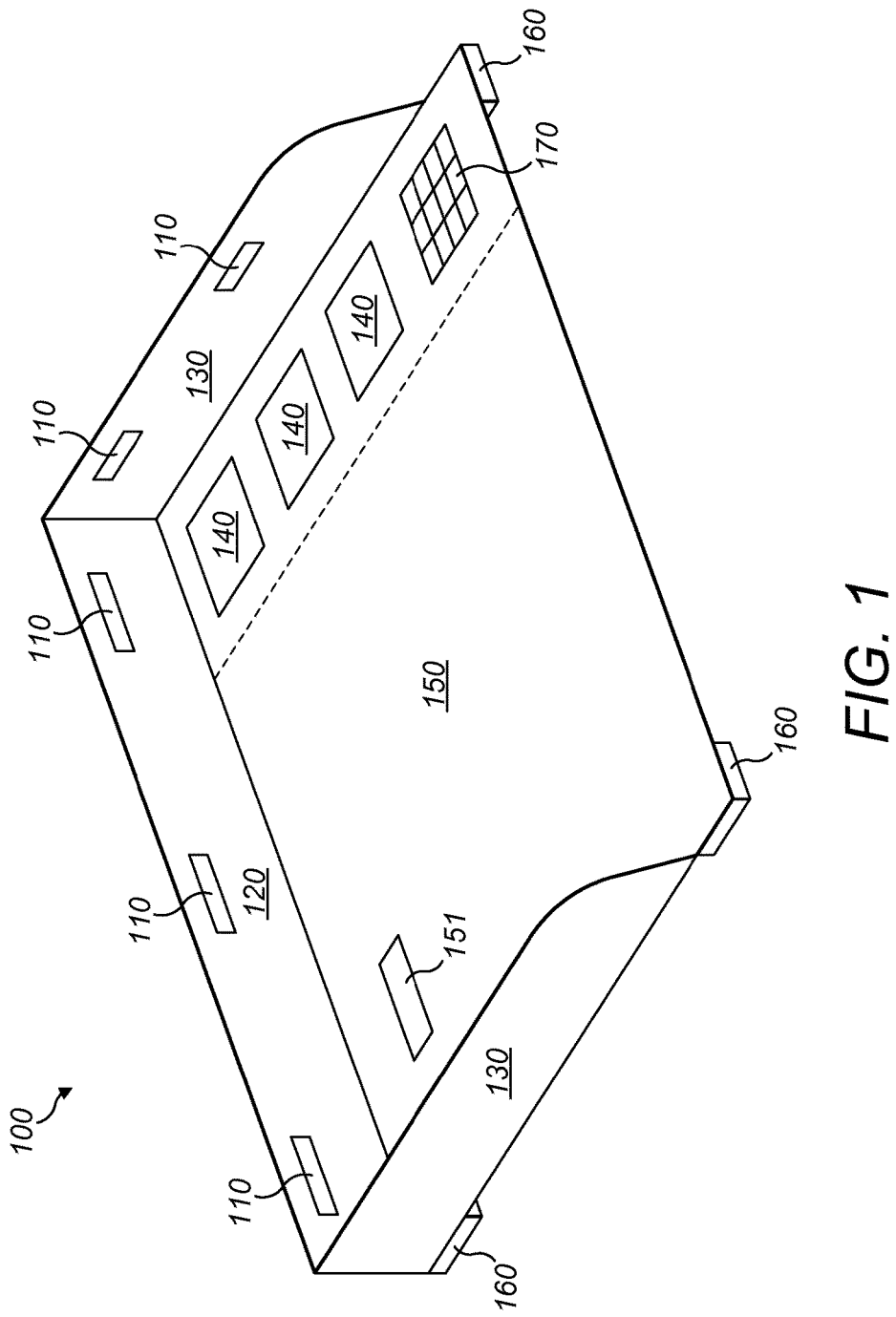
FIG. 1 illustrates an example connected consumables preparation area.

Example embodiments will now be described more fully with reference to the accompanying drawings.

The vast majority of consumable items such as groceries and stationery supplies are placed on a work surface at some point between entering a home, office or commercial kitchen/bar and being consumed. For example, groceries may be placed on a worktop on being removed from a shopping bag before being put away in a refrigerator or cupboard. They will then be placed on a worktop again when they are needed in order to prepare or transform them in some way for use. It is therefore proposed to provide a connected consumables preparation area or work surface, which may be placed on or integrated into a worktop, for example on which food and/or drink is prepared. This can be used to update an electronic inventory of consumables present in the home or commercial establishment in which the connected consumables preparation area is located.

This inventory could for example be accessible to a user on their mobile devices such as smartphones and tablets so that they can use the inventory or a processed form of it (e.g. a list of regularly purchased or "store cupboard" items, or recipe ingredients not currently listed as "present" in the inventory) as a shopping list, e.g. when in a supermarket or wholesalers.

Preparation/transformation of consumables on the connected food preparation area could involve removing packaging (e.g. unwrapping), peeling, chopping/slicing, cooking, pouring, combining with other consumables etc. The end product of preparation/transformation of the consumables could be finally disposed of within said home/dwelling or establishment in which the connected consumables preparation area is located and the consumables transformed for use, or elsewhere. For example, sandwich ingredients could be purchased and then brought into the kitchen of a home, office, restaurant or takeaway café. The sandwich ingredients are then placed on the connected consumables preparation area and automatically added to the consumables inventory before being moved for storage. At a later time, a sandwich is made using said ingredients on the connected consumables preparation area, transforming the ingredients by e.g. slicing cheese and unwrapping ham slices for the filling and combining bread, cheese and ham slices. If the context is a dwelling, the sandwich may be eaten by a member of the household, in the home or later on a picnic. If the context is a restaurant, the sandwich may be eaten by a customer on the premises. If the context is a takeaway, the sandwich may be eaten by a customer elsewhere.

This connected consumables preparation area comprises means of automatically gathering data relating to items brought into the home/business premises and/or used. For example it could comprise a barcode/QR code scanner and/or RFID reader for identifying items placed on or near it.

Alternatively or additionally, the connected consumables preparation area could comprise an optical character recognition (OCR) enabled scanner configured to read receipts for purchases and determine the items bought in the transactions so that the inventory can be updated accordingly.

Additions to the inventory using barcode/QR code scanning or RFID reading could be the default. However, if a new item is detected in the vicinity of the connected consumables preparation area but its details cannot be read (e.g. if a barcode/QR code label is partly obscured or missing or an RFID chip is corrupted), then data could be entered manually using a user interface device such as a touchscreen, keypad or microphone. This could be done for example by filling in a form with fields for various details such as product type, package size, expiry date etc. Alternatively, an identifier (such as the numerical code displayed below the image part of a barcode) can be entered, which can be looked up by the system in a local or remote look-up table to determine the required details.

Grocery items could be temporarily placed on the connected consumables preparation area before being put away on a shelf or in a cupboard or the refrigerator or freezer in order to "check them in" to the inventory. Single-use items could be "checked out" of the inventory when they are returned to the connected consumables preparation area for use. Remaining quantities of multiple-use items in the inventory could be updated each time they are brought to the connected consumables preparation area.

Scanners or readers could be used to uniquely identify individual packages of grocery items. Each package's barcode/QR code/RFID tag could comprise a part identifying the product and a part uniquely identifying that package, or identifying a factory run in which that package was produced, for example a representation of a serial number.

The data read by the scanner or reader could indicate further information such as expiry date. This information could be directly encoded into the barcode/QR code/RFID tag, or the connected consumables preparation area could query a merchant database to which it is connected, for example via an internet connection, using the package's unique ID or factory run ID. The database could list unique IDs or factory run IDs with corresponding information such as expiry date.

When an expiry date of an item on the inventory is approaching (i.e. a predetermined number, e.g. two, days prior to the expiry date), a reminder can be provided to a user to consume the item, for example through a user interface of the consumables preparation area or a connected user device. Similarly, alerts can be provided to reminder users to dispose of items when they expire. A user could also be provided with a prompt to add a regularly purchased item to a shopping list or online food order when an expiry date is approaching or passed. Alternatively, regularly purchased items such as milk or bread, stored on a predetermined list, could be automatically re-ordered when their expiry date is approaching or passed.

Other information could be determinable from barcodes/QR codes/RFID tags read by the connected consumables preparation area. For example the product identifier part or the database could comprise a list of allergens that could be contained in the product, and/or a full ingredients list. This could be used as a double-check on items brought into the kitchen of a household where someone has a severe allergy. For example the connected consumables preparation area could be programmed to sound an alert if a package containing peanuts is placed on it. The user would then know not to open the package. In a commercial kitchen, the alert could serve as a reminder to a chef to note any allergens contained in a new ingredient against menu items containing that ingredient. Similar alerts could be set up for meats, animal derived products or ingredients which are otherwise forbidden according to specific (e.g. religious or health-related) dietary plans so that special dietary requirements can be complied with.

The connected consumables preparation area could also comprise scales. These could be used as conventional digital scales for weighing out ingredients for a recipe. Alternatively or additionally they could be used to monitor usage in order to inform re-ordering.

For example, each time a tub of butter is placed on the preparation area it could be identified, whether manually by the user or using a scanner or reader as described. It can also be weighed and the weight recorded. A processor comprised in or connected to the connected consumables preparation area could over time determine an average serving weight and a usage pattern. When the remaining weight would provide only the number of servings expected to be used in the time taken to reorder and take delivery of a new tub, a new tub can be automatically ordered or the user can be asked if a new tub is required via a prompt by a user interface of the connected consumables preparation area. (Such a prompt could for example be text on a graphical user interface or an audio alert.)

The connected consumables preparation area could have a surface, or a part of a surface, of a material suitable for use as a chopping board.

The connected consumables preparation area could also comprise calendar functionality so that members of a household can share their plans with one another. Such a calendar could be synchronised with calendars stored on individual user devices connected to the consumables preparation area, for example each member of the household's smartphone or tablet. Information entered into the calendar could also be used to inform automated re-ordering. For example if the calendar indicates that a family holiday is approaching orders can be reduced accordingly.

Other sensors and data inputs could be integrated into the connected consumables preparation area. For example it could receive weather reports from a website or from a connected personal weather station/thermometer in the garden. These could be used to inform automatic re-ordering. For example if a household has in the past used a tin of hot chocolate quicker in colder weather than in warmer weather, the connected consumables preparation area could reorder hot chocolate when 4 servings remain if the weather is warm and when 8 servings remain when the weather is cold.

According to an inventory, and optionally expiry dates, stored by or available to the connected consumables preparation area, recipes could be recommended to a user. For example, recipes could be suggested comprising items on the inventory list approaching their expiry dates. The user could also be provided with a suggestion to purchase other items on the ingredient list for such a recipe, or those items could be automatically ordered.

A processor comprised in or connected to the connected consumables preparation area could also use data collected from items placed on it to determine at what stage of a recipe a user is at. This determination could then trigger control of connected kitchen equipment, for example pre-heating of a connected oven.

Ordering could be by means of an online account linked to the connected consumables preparation area and can be automated or performed according to a user request. An initial authorisation could act as approval to use a particular account for all orders indefinitely. Alternatively, user authorisation could be required before an order can be made, for example by the user entering one or more passwords or PINs into a user interface device comprised in the connected consumables preparation area, providing biometric authentication (e.g. by presenting their finger to a fingerprint scanner or their eye to an iris scanner comprised in the connected consumables preparation area) and/or presenting a physical or payment-enabled smartphone to a chip or NFC reader comprised in the connected consumables preparation area in a similar manner to an in-store transaction. The connected consumables preparation area could thus act as a personal point of sale (POS).

Ordering could be done with a particular merchant or the processor could be configured to select the most appropriate merchant from a predetermined list or a wider online search based on considerations such as price, proximity, delivery times etc. for individual items or periodic (e.g. weekly or fortnightly) "baskets".

Once an order is made, the inventory could be updated to reflect the "purchased" status of the item (as opposed to "present" or "absent") so that further orders of the same item are not made automatically before it arrives.

For similar reasons, if a connection is available between the device storing the inventory and a consumables merchant, then use of a predetermined debit, credit or loyalty card to purchase an item in a branch of said merchant could cause an update of the inventory to include said item as "purchased". The status can then be updated to "present" when the item is detected by the connected consumables preparation area.

As part of the ordering process, an automatic check could be made of an electronic wallet of loyalty cards, coupons, discount vouchers etc. for the household so that any that can be applied to the order are used. This check could be made by the processor comprised in or connected to the connected consumables preparation area against a locally or remotely stored electronic wallet. The details of any usable loyalty cards, coupons, discount vouchers etc. could then be transmitted with the order. Alternatively, details of the entire electronic wallet could be transmitted with the order to be selected and applied to the order as appropriate by a server of the merchant or another entity involved in the transaction such as a bank or card issuer. A message could then be returned to the connected consumables preparation area or a user device connected thereto to update the electronic wallet in order to remove any coupons or vouchers used and add any earned by the transaction. If the electronic wallet is stored remotely, e.g. with the merchant or a bank or card issuer, then the order could be transmitted with an identifier of the electronic wallet so that it can be retrieved by the merchant, bank or card issuer and any relevant offers can be applied to the order.

The connected consumables preparation area, or a system to which it belongs, could be self-learning. That is, it could learn consumer behaviour over time and is able to make predictions and/or suggestions based on the learned behaviour.

For example, after the system has acquired statistically significant data concerning a consumer's purchasing habits, such as what products are bought, in what quantities, and how frequently, the system is able to predict what items need to go on the shopping list, in what quantities, in what size, and when, and generate an auto-fill shopping list accordingly. The system could automatically place an order based on such a shopping list. The shopping list can be completely auto-generated by the system, manually entered by the user, or be generated by the system and modified by the user. The system could be able to plan meals ahead e.g. for a day, week or fortnight and generate the shopping list accordingly.

The inventory could be updated based on learned purchasing behaviour. For example, if the user purchases milk once a week, the system learns that a milk carton is consumed within one week, and will remove milk from the inventory list one week after it was purchased and add milk to the shopping list. Additionally, the inventory could be updated when the user prepares food using a particular recipe. The system removes the food items that are used in the recipe, optionally only in the quantities dictated by the recipe. Such updates may be done automatically, without any input from the user, or instead they may be suggested on a user interface of the consumables preparation area or a connected device, prompting the user to confirm the inventory update. Such a prompt could for example comprise one or more of text on a graphical user interface of a touch screen display or an audio alert. Prompts could be used often during the initial use/set-up of the system to enable it to learn the consumer purchasing/consumption/use behaviour, and then reduced as the system learns.

Other applications could also be accessible through user interfaces of the connected consumables preparation area, for example clocks and timers, applications providing conversions for weights and measures, cooking temperatures etc. or applications for estimating the calorie content or nutritional breakdown of consumables opened or prepared on the connected consumables preparation area. Controls could also be provided on the connected consumables preparation area for kitchen equipment such as an oven, hob, extractor fan, lights, dishwasher etc. The applications need not be related to cooking; the connected consumables preparation area could perform other user device functions such as those commonly available through Personal Computers (PCs), laptops, tablets, smartphones, televisions and radios. For example a (preferably waterproof) screen and speakers could be provided so that the user can consume media content such as television, film, music and radio in the kitchen while cooking or unpacking groceries. The connected consumables preparation area could also comprise communication facilities so that phone calls, text messages and emails could be sent and/or received through it, or an intercom system, for example so that people in other parts of a home can be called to the kitchen when a meal is ready.

While the example uses above are described for domestic kitchens, such a connected consumables preparation area could also be useful in places of business such as offices or commercial kitchens. In that case inventory and intelligent re-ordering could be linked to a customer ordering and/or payment system. This could provide data for business analysis. For example, the quantities of ingredients expected to be used for a particular dish ordered by a customer in a café or restaurant could thereby be compared to the quantities actually prepared in order to monitor staff's portion sizing.

Other consumables than the food and drink generally described as grocery items could also be inventoried using a connected consumables preparation area as described herein. Thus, "grocery items" and similar terminology as used herein should be read to comprise perishable and non-perishable items, food, drink, toiletries, cleaning products, stationery items, printer cartridges and such like.

FIG. 1 shows an example connected consumables preparation area 100 comprising multiple barcode scanners 110 in back wall 120 and side walls 130 and displays (which could be touchscreen) 140 for various apps on the substantially horizontal, substantially flat consumables preparation surface 150. Said substantially flat surface 150 could act as digital scales with a readout screen 151. The connected consumables preparation area could be incorporated into a work surface, for example a kitchen worktop, or it could be freestanding (and thus easier to retro-fit and potentially movable between different areas of a worktop or table for ease of cleaning), in which case it could comprise feet 160 as shown. It could further comprise one or more user interface devices such as keypad 170.

Figure 2:
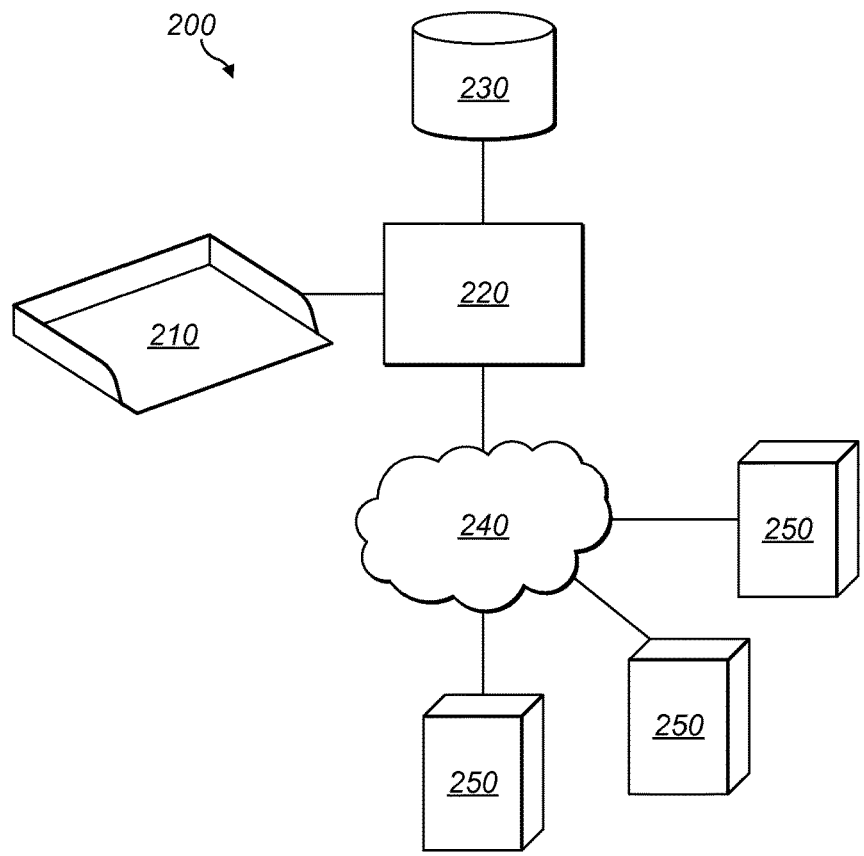
FIG. 2 is a schematic of an example system comprising a connected consumables preparation area.

FIG. 2 is a schematic of an example system 200 comprising a connected consumables preparation area 210. Comprised in either the connected consumables preparation area or a user device such as a smartphone, tablet, laptop, or PC, connected to the connected food preparation area by a wired or wireless connection are processor 220 and memory 230. Processor 220 is further connected to a network 240 such as the internet. The processor 220 can thereby communicate with servers 250 also connected to network 240, for example servers of consumables merchants, card issuers and banks. A software development kit (SDK) could be implemented to allow an application running on the processor to read data from the connected consumables preparation area's various sensors/scanners and send them, or data derived from them, to an appropriate server via an application programming interface (API).

Figure 3:
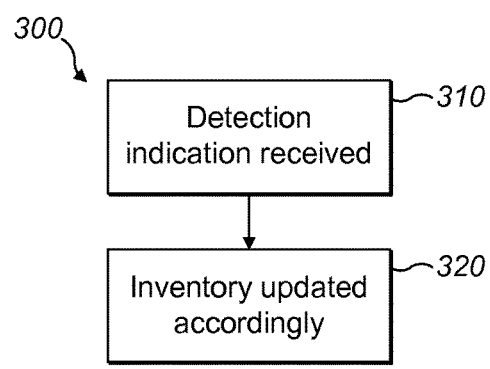
FIG. 3 is a flowchart of a method of maintaining an electronically stored consumables inventory.

FIG. 3 is a flowchart of a method 300 of maintaining an electronically stored consumables inventory. At 310 an indication is received from a consumables preparation area comprising an electronically stored consumables inventory update initiator that a consumable item has been detected by said update initiator. (The update initiator comprises one or more of: a user interface device, a barcode scanner, a QR code scanner, an RFID tag reader, a scanner configured for OCR and digital scales.) At 320, in response to receiving said indication, the inventory is updated.

Figure 4:
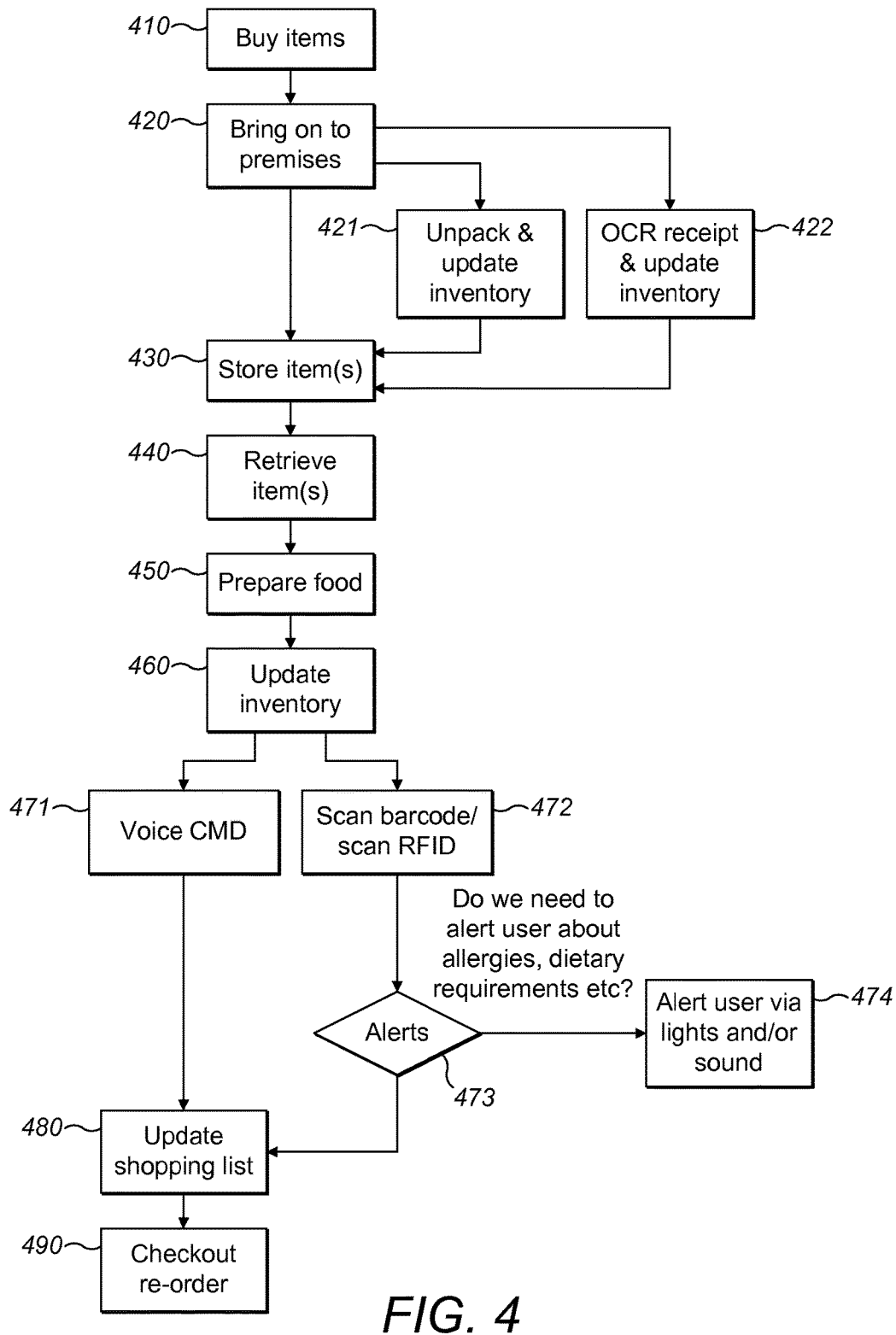
FIG. 4 is a flowchart of an example use of an example connected consumables preparation area.

FIG. 4 is a flowchart of an example use of an example connected consumables preparation area. At 410 consumable items are purchased. This can encompass purchases at a plurality of locations at a variety of dates and times. At 420 the consumables are brought onto the premises the connected consumables preparation area is located at. At 421, the items are unpacked on/in the vicinity of the connected consumables preparation area and the inventory is updated e.g. by means of RFID tag detection, barcode or QR code scanning, manual entry with a user interface device or any combination of these. Alternatively, at 422 one or more receipts are read by an OCR scanner and the inventory updated accordingly. At 430, the consumable items are stored away e.g. in a refrigerator, freezer or cupboard.

At 440 one or more consumable items are retrieved. At 450 food is prepared comprising those consumables. At 460 the inventory is updated, for example by means of a voice command at 471 or by scanning a barcode or RFID tag at 472. In the latter case, the need for an appropriate alert can optionally be queried at 473 and the alert provided at 474.

At 480 a shopping list is updated according to the inventory updates, and at 490 consumables are re-ordered accordingly.

Figure 5:
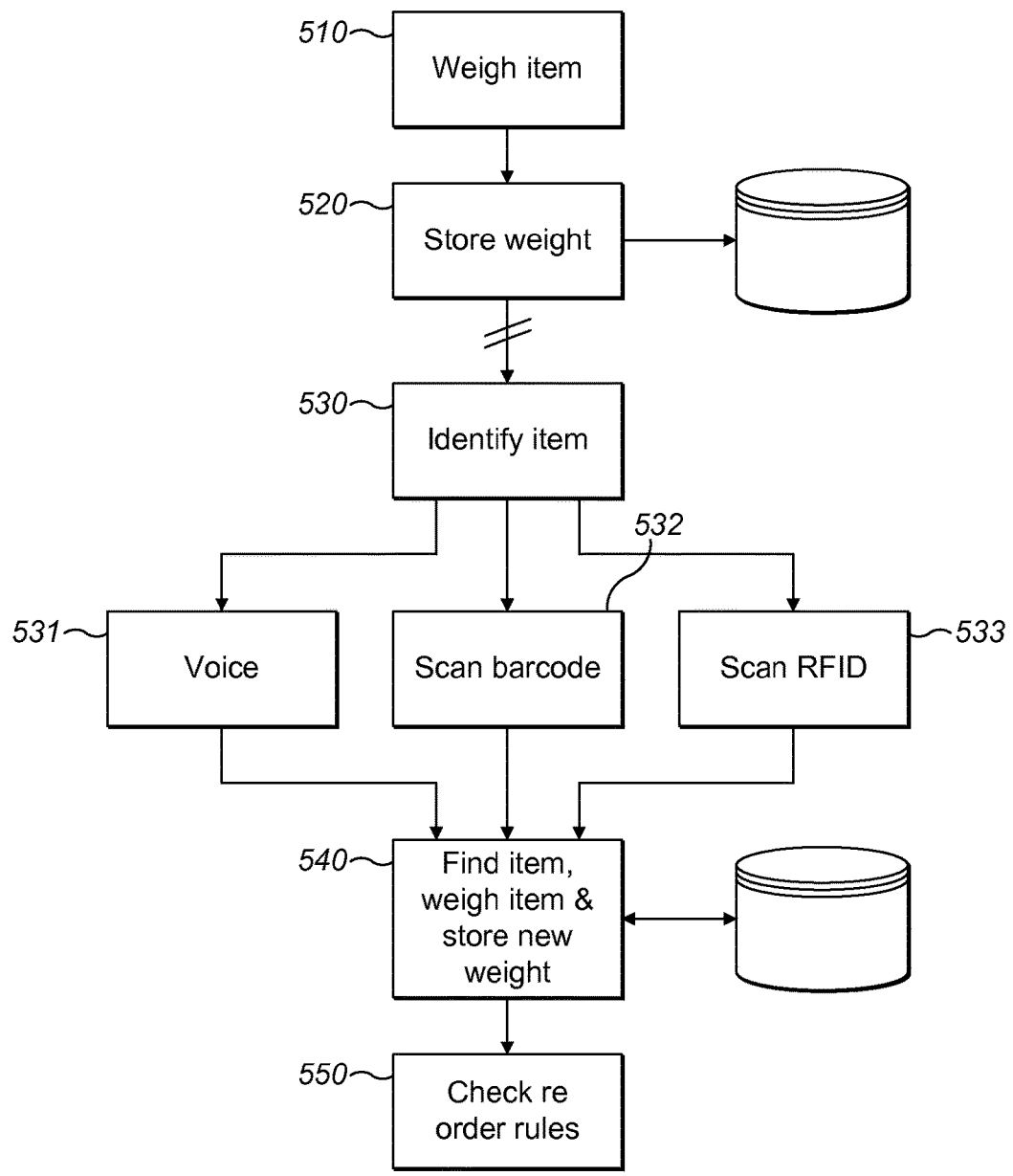
FIG. 5 is a flowchart of an example use of a scales function of an example connected consumables preparation area.

FIG. 5 is a flowchart of an example use of a scales function of an example connected consumables preparation area. At 510 a user places a consumable item on the scales portion of the connected consumables preparation area surface and it is weighed. At 520 the weight detected is stored with a time/date stamp.

At 530, at a later time the item is identified as having been returned to the connected consumables preparation area, e.g. by a voice command at 531, by barcode scanning at 532 or by RFID scanning at 533. At 540 the processor finds the identified item in the inventory, re-weighs the item and stores the new weight with a time/date stamp. At 550 stored re-order rules are checked to determine whether the new weight indicates the item should be reordered.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

As described, the functions and/or steps and/or operations described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Further, it should be appreciated that one or more aspects of the present disclosure transform a general-purpose computing device into a special-purpose computing device when configured to perform the functions, methods, and/or processes described herein.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the exemplary embodiments herein are only examples, and are not intended to limit the scope, applicability, operation, or configuration of the disclosure in any way. It will be further appreciated by a person skilled in the art that numerous variations and/or modifications may be made to one or more of the above-described embodiments without departing from the spirit or scope of the disclosure as broadly described in the appended claims. The above-described embodiments are, therefore, to be considered in all respects to be illustrative and not restrictive.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As described above, the method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

What is claimed is:

1. A consumables preparation area comprising a substantially flat consumables preparation surface and an electronically stored consumables inventory update initiator, said update initiator comprising a barcode/quick response (QR) code scanner directed at the substantially flat consumables preparation surface, a Radio-Frequency Identification (RFID) tag reader, an optical character recognition (OCR) scanner, and a digital scale;
   wherein the update initiator is configured for use within a dwelling or establishment in which a consumable is to be transformed for use; and
   wherein the update initiator is configured to transmit an indication of the consumable to an electronic data processing means when the consumable is placed on the consumables preparation surface and when the consumable is identified by at least one of the barcode/OR code scanner, the RFID tag reader, and the OCR scanner and weighed by the digital scale, thereby permitting an inventory of consumables associated with the dwelling or establishment to be updated based on the consumable.

2. The consumables preparation area of claim 1, further comprising a back wall and one or more side walls rising from the periphery of said consumables preparation surface, wherein one or more of said one or more side walls comprises at least the barcode/OR scanner.

3. The consumables preparation area of claim 1, further comprising a transmitter;
   wherein said transmitter is configured to send a message to initiate control of a kitchen appliance having a receiver when the update initiator makes a detection determined to indicate that a predetermined stage of a recipe has been reached.

4. A system for maintaining an electronically stored consumables inventory, the system comprising:
   a consumables preparation area including:
      a consumables preparation surface and an electronically stored consumables inventory update initiator, said update initiator comprising a barcode and/or quick response (QR) code scanner directed at the consumables preparation surface, a Radio-Frequency Identification (RFID) tag reader, and a digital scale;
      wherein the update initiator is configured for use within a dwelling or establishment in which said consumables are to be transformed for use;
   electronic data processing means, connected to the update initiator, configured to process data received from the update initiator and accordingly update the consumables inventory; and
   electronic data storage means configured to store the consumables inventory;
   wherein said electronic data processing means is configured to initiate placement of an order with a merchant for at least one consumable, through an electronic merchant ordering system, in response to determining that the consumables inventory in the electronic data storage means does not match a predetermined list of consumable items.

5. The system of claim 4, wherein:
   said electronic data storage means are further configured to store authentication data stored during an initial set-up procedure; and said order placement comprises transmitting an authorization comprising or derived from said authentication data.

6. The system of claim 5, wherein:

said electronic data storage means are further configured to store a list of one or more merchants; and said order is made with the merchant as selected from said list of one or more merchants according to one or more predetermined rules.

7. The system of claim 5, further comprising networking apparatus configured to provide the system with an internet connection, wherein:

said electronic data processing means is configured to search the internet for merchants of the at least one consumable; and said merchant is one of multiple merchants identified in the search and selected according to one or more predetermined rules.

8. The system of claim 5, wherein:

said electronic data storage means are further configured to store details of one or more loyalty cards, coupons or discount vouchers; and said electronic data processing means is further configured, in connection with initiating placement of said order, to provide details of one or more of said loyalty cards, coupons or discount vouchers to said ordering system.

9. The system of claim 4, wherein:

the electronic data storage means is configured to store a list of one or more forbidden ingredients; and the electronic data processing means is configured to, in response to determining that a consumable item comprising one or more of said forbidden ingredients is to be added to the consumables inventory, initiate an alert.

10. The system of claim 4, wherein the electronic data processing means is configured to analyze one or more of: past ordering patterns, a user's calendar/diary and weather reports/forecasts, and to place orders automatically based on the analyzed one of the past ordering patterns, the user's calendar/diary and the weather reports/forecasts.

11. The system of claim 4, wherein the electronic data storage means is configured to store an expiration date for an item of the consumables inventory in response to receiving an indication of the expiration date from the update initiator.

12. The system of claim 11, wherein said indication of the expiration date is comprised in a barcode, a QR code, an RFID tag or a label on the item readable by a user and capable of being entered by the user into a user interface device.

* * * * *